United States Patent [19]

Howell et al.

[11] Patent Number: 5,613,786
[45] Date of Patent: Mar. 25, 1997

[54] KEYBOARD WITH ADJUSTABLE SPLAY AND PRONATION PIVOT POINTS

[75] Inventors: Bryan Howell; Bryan Hunter, both of Austin, Tex.

[73] Assignee: Dell U.S.A., L.P., Austin, Tex.

[21] Appl. No.: 561,051

[22] Filed: Nov. 20, 1995

[51] Int. Cl.⁶ .................................................. B41J 5/10
[52] U.S. Cl. ........................................ 400/489; 400/472
[58] Field of Search .................................... 400/489, 472; 361/680; 345/168

[56] References Cited

U.S. PATENT DOCUMENTS

| | | | |
|---|---|---|---|
| 3,990,565 | 11/1976 | Felton et al. | 400/70 |
| 4,378,553 | 3/1983 | McCall | 400/472 |
| 4,509,873 | 4/1985 | Ryan | 400/489 |
| 4,597,681 | 7/1986 | Hodges | 400/488 |
| 4,661,005 | 4/1987 | Lahr | 400/489 |
| 4,917,516 | 4/1990 | Retter | 400/489 |
| 5,122,786 | 6/1992 | Rader | 345/168 |
| 5,137,384 | 8/1992 | Spencer et al. | 400/489 |
| 5,178,477 | 1/1993 | Gambaro | 400/489 |
| 5,228,791 | 7/1993 | Fort | 400/489 |
| 5,267,127 | 11/1993 | Pollitt | 400/489 |
| 5,278,779 | 1/1994 | Conway et al. | 364/708.1 |
| 5,302,040 | 4/1994 | Louis | 400/489 |
| 5,311,210 | 5/1994 | O'Brien et al. | 345/168 |
| 5,351,066 | 9/1994 | Rucker et al. | 345/168 |
| 5,360,280 | 11/1994 | Camacho et al. | 400/489 |
| 5,372,441 | 12/1994 | Louis | 400/489 |
| 5,426,449 | 6/1995 | Danziger | 345/168 |
| 5,457,452 | 10/1995 | Skovronski | 341/22 |
| 5,502,460 | 3/1996 | Bowen | 345/168 |

OTHER PUBLICATIONS

*Lexmark Select–Ease keyboard splits in half, adjusts to a variety of angles*, PC Week, Jun. 6, 1994, pp. 25 and 29.

*Primary Examiner*—Edgar S. Burr
*Assistant Examiner*—Daniel J. Colilla
*Attorney, Agent, or Firm*—Haynes and Boone, L.L.P.

[57] ABSTRACT

A data input keyboard apportioned between two demi-boards, the splay and pronation of which may be adjusted. Each of the demi-boards include a plurality of user activated keys extending therefrom, and define a distal side for orientation away from the user and a proximate side for orientation adjacent the user. The distal and proximate sides of the demi-boards are joined by inwardly facing sides and outwardly facing sides. A universal joint rotatably couples the inwardly facing sides of the demi-boards. Pivot point selectors are slidably mounted to the demi-boards for selecting pivot points along the outwardly facing sides, about which points the demi-boards are pivotably connected to the base member and are constrained for pivotal movement about the selected pivot points between a retracted position in which the demi-boards are co-planar and the inwardly facing sides are parallel and an extended position in which the demi-boards are splayed and pronated.

25 Claims, 3 Drawing Sheets

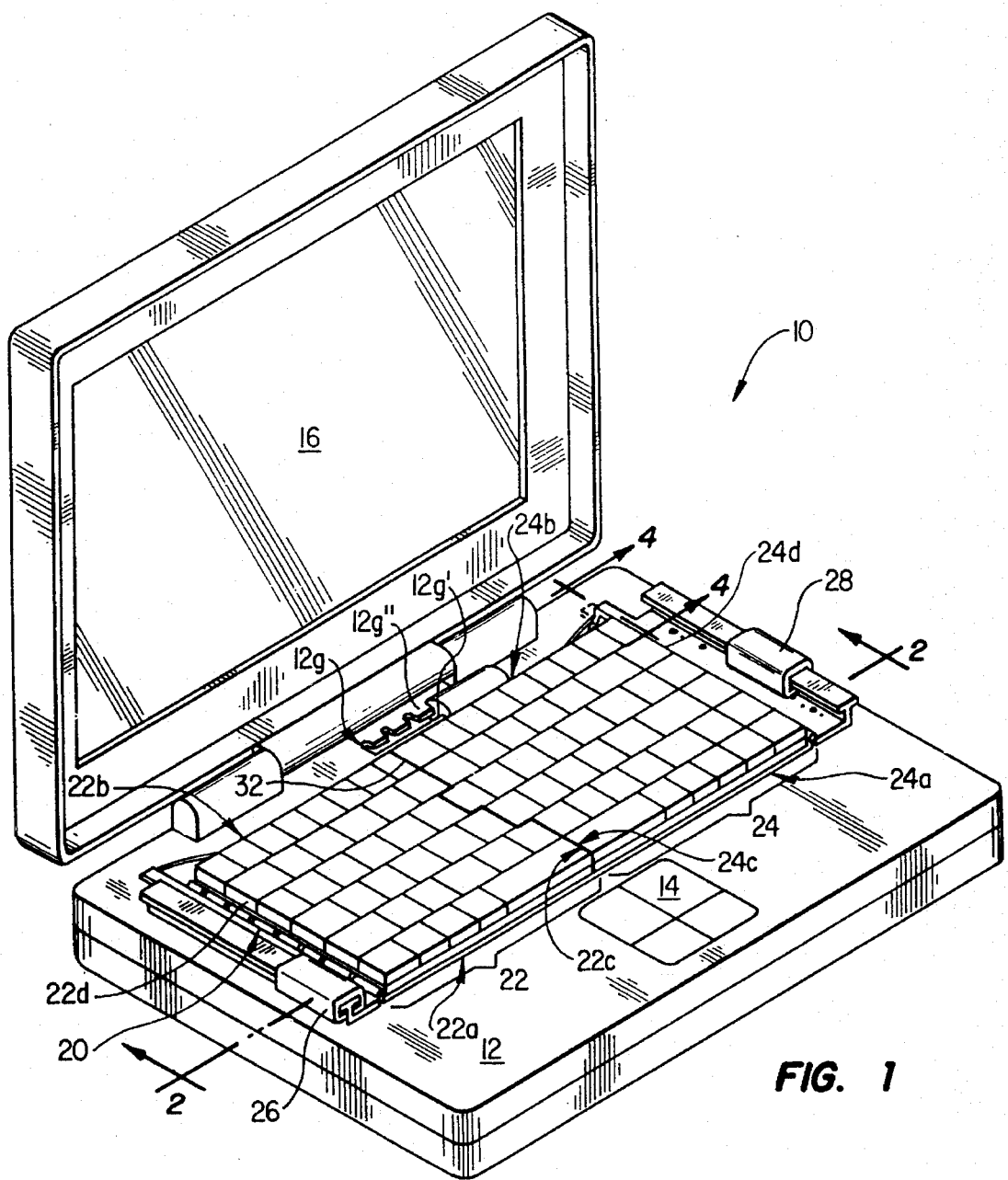
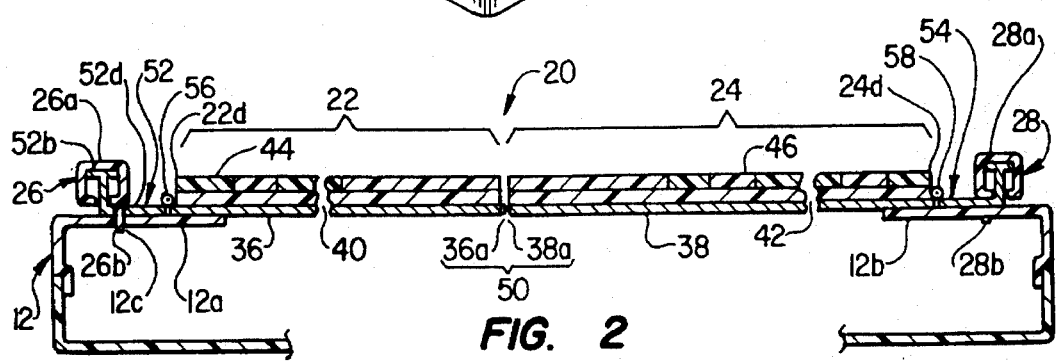
FIG. 1
FIG. 2

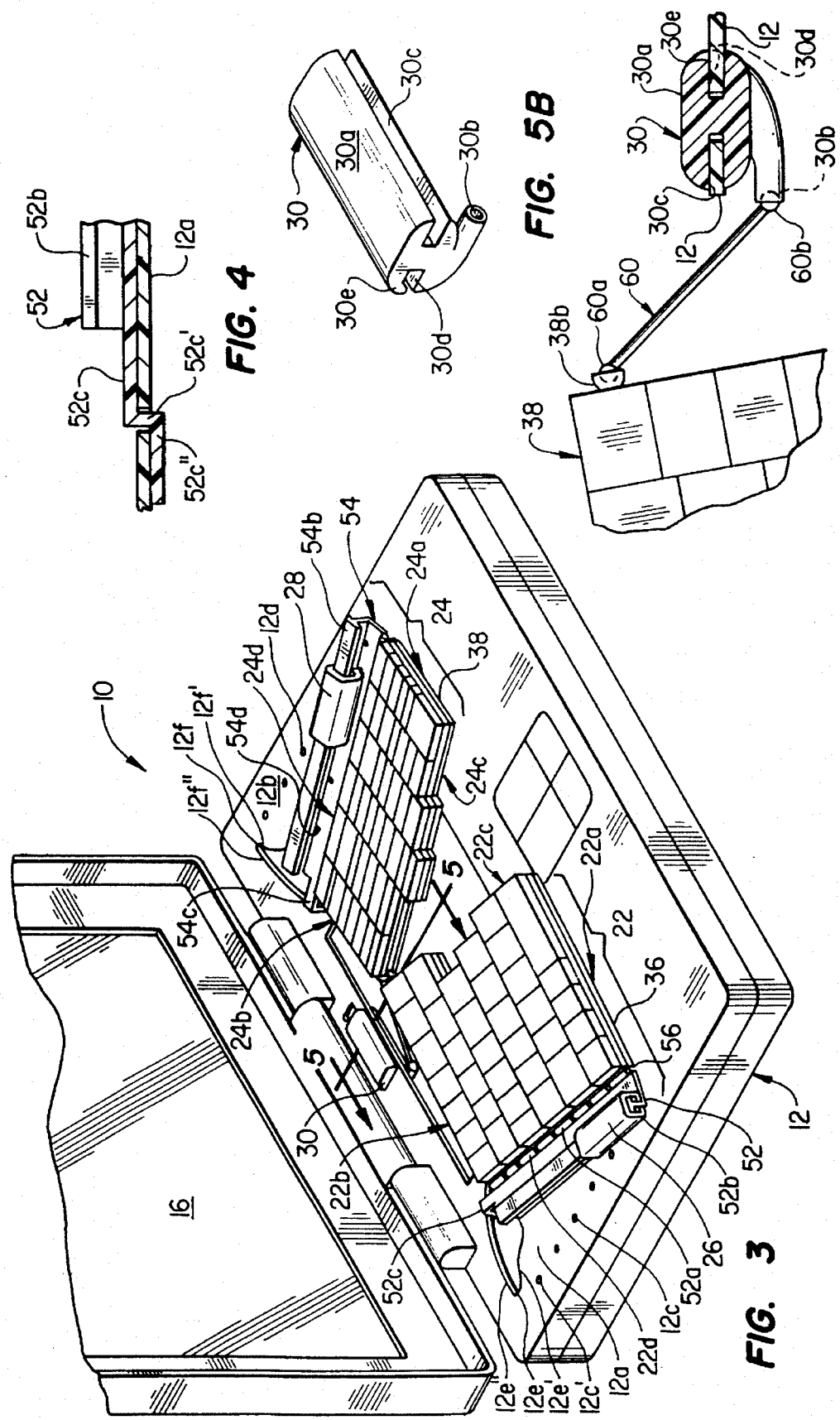

KEYBOARD WITH ADJUSTABLE SPLAY AND PRONATION PIVOT POINTS

BACKGROUND OF THE INVENTION

The invention relates generally to keyboards used for data entry and, more particularly, to such keyboards having adjustable splay and pronation.

The frequent use of keyboards for interfacing with computers and other devices can cause serious physical injury and pain to the wrists and other areas of the arms of users. This is generally caused by repetitive motion of the user's fingers on the keys of the keyboards. These disorders are commonly known as cumulative-trauma disorders or repetitive-motion injuries. As the number of individuals using keyboards on a continuous and repetitive basis has been increasing, these types of disorders have become more prevalent. Such repetitive use can also cause physical damage to the wrist, particularly to the carpal tunnel of the wrist. Such damage to the carpal tunnel, known as Carpal Tunnel Syndrome, can cause serious weakening of the hands and reduction in dexterity.

Tests indicate that a standard monoplane keyboard, i.e., a keyboard defined in but one plane and lying generally flat on a table, exacerbates the problems associated with repetitive-motion injuries. The monoplane keyboard forces the user to rotate his or her forearms from a relaxed position to an extreme position so that the fingertips of each hand are horizontal. Furthermore, both wrists must be flexed away from the thumb side of the hand in order to line up the fingertips with the longitudinal rows of keyboard keys. It has been determined that repositioning the keyboard to permit a more "natural" or unflexed positioning of the forearms and hands significantly reduces the stress on the wrists and elbows, thereby reducing the instances of repetitive-motion injuries resulting from the use of keyboards. To this end, several keyboard designs have been developed.

For example, U.S. Pat. No. 4,509,873 issued to Ryan discloses a "split" keyboard in which keys are apportioned between two smaller boards, or "demi-boards," which may be configured into an A-frame orientation to effect the pronation of the keyboard. The keyboard incorporates a base member having a distal face oriented away from the user and a proximate face oriented adjacent the user. Adjustment from a flat horizontal position to an angled position is achieved by raising the central portion of the demi-boards from the flat base member. The base member is angled so that the distal side is higher than the adjacent side. Additionally, the intersection point of the two demi-boards is perpendicular to the plane of the top face of the base member.

In another example, U.S. Pat. No. 4,597,681 to Hodges discloses an adjustable keyboard having a base member and a pair of demi-boards which may be raised at their joining edge into an A-frame configuration to adjust the pronation. Furthermore, each demi-board may be pivoted within its respective plane about an axis perpendicular to that plane to adjust the splay, in addition to the pronation, of the keyboard. Hodges provides a generally flat base member with a generally dish-shaped surface of the keys. The keys may be positioned in a non-planar manner on each demi-board.

Each of these A-frame type of adjustable keyboards, while representing an improvement over the m,n,plane keyboard in terms of hand positioning, do not generally provide sufficient optimization of wrist and forearm positions when the fingers are placed in contact with the key faces. More particularly, these keyboards still force the user to bend the wrists upwardly and/or outwardly to align the fingertips with the keys on each demi-board. It is not possible, if one is to maintain proper finger alignment to the keys, to orient the wrists in linear alignment with the forearm, as the planes of the demi-boards in an A-frame orientation are still parallel to the proximal-distal axis of the keyboard base. In other words, the user is still forced into a position where his wrists are bent backwards to some degree forming an angle with the forearm, in order to properly contact such a keyboard.

As a consequence, keyboards have continued to evolve, with more recent designs utilizing adjustable demi-boards which may be raised, with respect to a base member, to a position wherein the distal edge of the demi-boards is oriented inwardly as compared to the adjacent edges of the demi-boards. As a result, when compared to the A-frame configurations, the demi-boards more closely parallel the forearms of the user so that the fingertips of the user may contact the keys on the demi-boards while maintaining improved linear alignment of the wrist and forearms.

As an example of a more recent keyboard design, U.S. Pat. No. 5,351,066 to Rucker et al. discloses an adjustable keyboard in which a pair of demi-boards are extendable from a retracted, flat position to an extended, tetrahedral position wherein the distal side of one of the demi-boards is closer to the other demi-board than the proximate side. While the Rucker keyboard provides for adjustment of both the splay and the pronation of the keyboard, it does so with only a single degree of freedom, i.e., the splay and pronation can not be independently adjusted. Moreover, Rucker does not provide for independent adjustment of the separate demi-boards either.

U.S. Pat. No. 5,228,791 to Fort cures some of the deficiencies of the Rucker invention in a keyboard arrangement in which a conventional keyboard is divided into two sections, each of which is separably supported on a joint which is freely rotatable and pivotable. The joint however is unwieldy and would not be feasible in a portable personal computer such as a "notebook" or "laptop" computer.

Therefore, what is needed is a keyboard in which the splay and the pronation thereof may be independently adjusted and which would be compatible with the space constraints of a relatively small portable computer.

SUMMARY OF THE INVENTION

The present invention, accordingly, provides a keyboard having demi-boards with adjustable pivot points formed along the outer edges thereof that overcome or reduce the disadvantages and limitations associated with prior keyboard designs.

In accordance with the present invention, a data input keyboard is apportioned between two demi-boards, the splay and pronation of which may be adjusted. Each of the demi-boards include a plurality of user activated keys extending therefrom, and define a distal side for orientation away from the user and a proximate side for orientation adjacent the user. The distal and proximate sides of the demi-boards are joined by inwardly facing sides and outwardly facing sides. A universal joint rotatably couples the inwardly facing sides of the demi-boards. Pivot point selectors are slidably mounted to the demi-boards for selecting pivot points along the outwardly facing sides, about which points the demi-boards are pivotably connected to the base member and are constrained for pivotal movement about the selected pivot points between a retracted position in which the demi-boards are co-planar and the inwardly facing sides are parallel and an extended position in which the demi-boards are splayed and pronated. A lift controller is interconnected between the base member and the universal joint for adjusting and controlling the height of the universal joint and the pronation of the demi-boards, which pronation becomes more pronounced, and splay less pronounced, as the pivot selectors are moved toward the proximate ends of the outer sides.

A technical advantage achieved with the present invention is that it allows the splay as well as the pronation of a keyboard to be adjusted into a large number of configurations, thereby aiding in the reduction of cumulative-trauma disorders and repetitive-motion injuries which commonly result from the repetitive motion of the hands and fingers on conventional keyboards.

Another technical advantage achieved with the present invention is that it is sufficiently compact to be implemented in a portable computer, such as a laptop or notebook computer.

BRIEF DESCRIPTION OF THE DRAWINGS

FIG. 1 is a perspective view of a personal computer (PC) utilizing a keyboard according to a first embodiment of the present invention.

FIG. 2 is an cross-sectional view of the PC of FIG. 1 taken along the line 2—2 of FIG. 1.

FIG. 3 is a perspective view of a portion of the PC of FIG. 1 showing the keyboard in a splayed and pronated configuration.

FIG. 4 is an elevational view of a broken-away portion of the PC taken along the line 4—4 of FIG. 1.

FIGS. 5A and 5B are broken away perspective views of the PC of FIG. 1 taken along the line 5—5 of FIG. 3.

DETAILED DESCRIPTION OF THE PREFERRED EMBODIMENT

Figure 6:
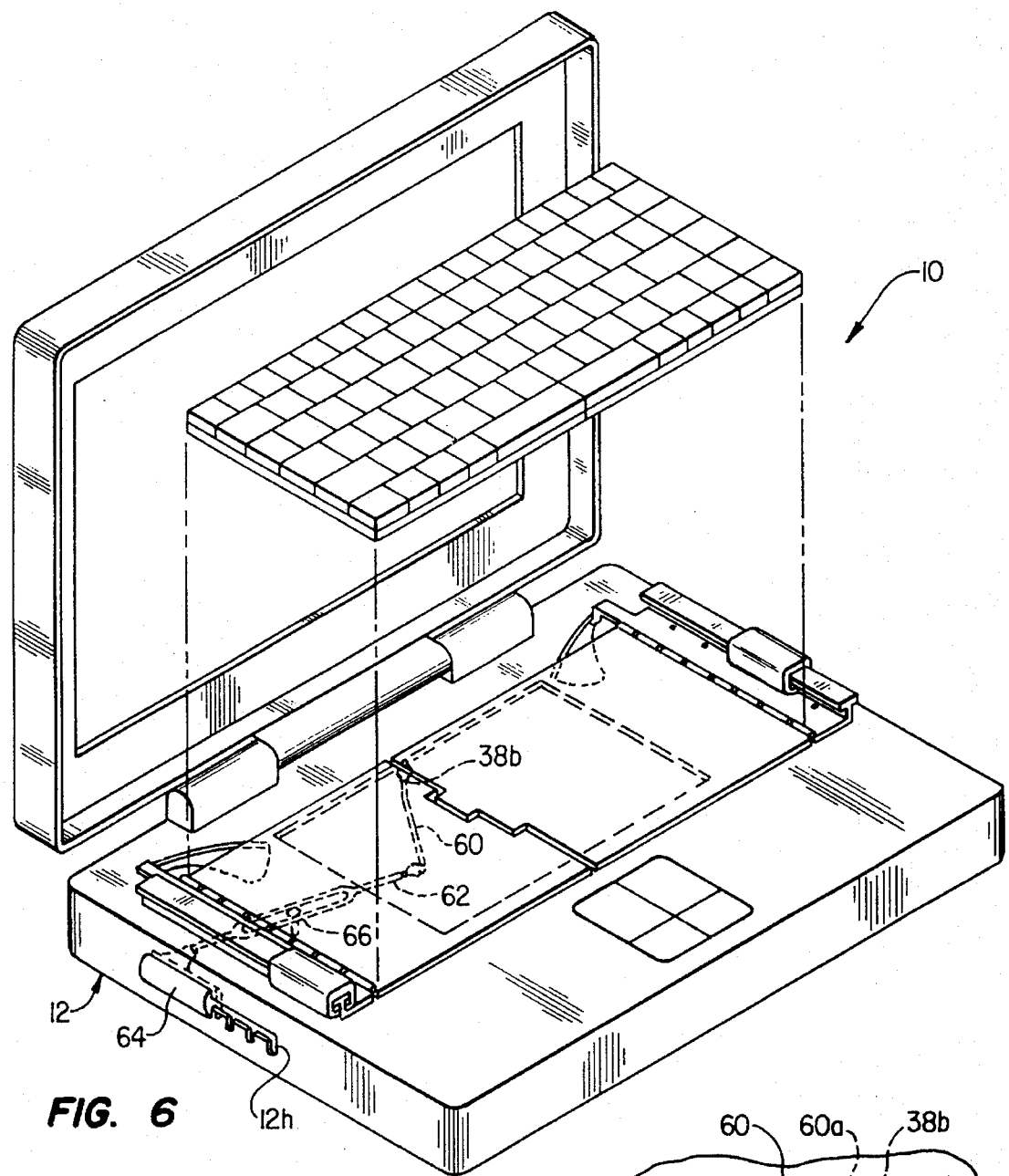
FIG. 6 is a partially exploded perspective view of an alternate embodiment of the PC of the present invention.

In FIG. 1 the reference numeral 10 refers to a portable personal computer (PC) embodying features of a first embodiment of the present invention. The PC 10 includes a base member 12, a graphical pointing device 14, a display screen 16 and, as viewed in FIG. 1, a keyboard assembly 20 comprising a left demi-board 22 and a right demi-board 24. As will be described below, the PC 10 also includes, as viewed in FIG. 1, left and right pivot point selectors 26 and 28, respectively, for selecting a pivot point about which the respective demi-boards 22 and 24 may be rotated to effect a splayed and/or pronated configuration to be described. A lift controller 30, having a body 30a, is provided for lifting the demi-boards 22 and 24 to facilitate pronation thereof as will also be described below. It is understood that a conventional ribbon cable (not shown) is also provided for electrically connecting the demi-boards 22 and 24 to the PC 10 as the splay and pronation thereof are adjusted.

It will be appreciated that, as viewed in FIG. 1, the demi-boards 22 and 24 are configured in a retracted, flat position rendering them co-planer with the base member 12 and virtually identical to a standard computer data entry keyboard. Optimally, the shaping, position, and tactile pressure required for depression of a key is similar to that found in a standard keyboard so that adjustment to the keyboard assembly 20 is minimized and so that the user's tactile abilities in orienting himself or herself with respect to the keyboard assembly 20 are unchanged. This enables the user to use the keyboard assembly 20 in the retracted, or flat, position in much the same manner as a "standard" keyboard, while having the option to also use the keyboard assembly 20 in the manner to be described.

The demi-boards 22 and 24 contain a plurality of user-activated keys laid out in a QWERTY arrangement, though it should be appreciated that other key arrangements may be employed with the keyboard assembly 20, such as the Dvorak or other key layouts. Each key is reserved, in accordance with established typing convention, for actuation by the user to generate a signal to display or type the symbol, letter, or number corresponding to the key depressed.

The left and right demi-boards 22 and 24 are split in an offset manner along a line 32 which passes between adjacent keys on the keyboard assembly 20 and which is offset along each key row in order to avoid splitting a key position. The line 32 also bisects a space bar into two halves. As further shown in FIG. 1, the left and right demi-boards 22 and 24 define, respectively, left and right proximate sides 22a and 24a intended for orientation adjacent the user, left and right distal sides 22b and 24b intended for orientation away from the user, left and right inner sides 22c and 24c facing each other, and left and right outer sides 22d and 24d opposing each other.

With reference to FIG. 2, and in accordance with conventional keyboard design, the demi-boards 22 and 24 comprise, respectively, metal plate substrates 36 and 38, overlaid by electrically responsive plastic membranes 40 and 42, the thickness of which has been exaggerated for convenience of presentation. The membranes 40 and 42 are overlaid by monoblocks 44 and 46, which monoblocks have keys arranged thereon.

In accordance with the present invention, and as partially shown in FIG. 2, a socket 36a is formed at the inner distal corner of the metal plate 36 and a mating ball 38a is formed at the inner distal corner of the metal plate 38. The ball 38a and the socket 36a are coupled to form a conventional ball and socket universal joint 50, thereby pivotably connecting the left and right demi-boards 22 and 24 together at the intersection of the distal sides 22b and 24b and the inner sides 22c and 24c of the respective metal plates 36 and 38.

The outer sides 22d and 24d of the respective metal plates 36 and 38 are hingedly attached to a left rail 52 and a right rail 54, respectively, via two conventional piano hinge pins 56 and 58, respectively, which pass through appropriate hinge barrel portions of each corresponding member. For example, as more clearly shown in FIG. 3 with respect to the left rail 52, the piano hinge pin 56 passes through a plurality of barrel portions 52a of the rail 52 as well as corresponding barrel portions extending from the plate 36. It is understood that the outer sides 22d and 24d may be hingedly attached to the left and right rails 52 and 54, respectively, via a number of other types of hinges such as, for example, plastic "living" hinges or clutch hinges. Since the connection between the rail 54 and the plate 38 is identical to the foregoing, it will not be described in detail.

As further shown in FIG. 3, the rails 52 and 54 include horizontally extending flange portions 52b and 54b, and tab portions 52c and 54c, for reasons to be described. As shown in FIG. 4, the tab 52c includes a downwardly extending portion 52c' and a horizontally extending portion 52c". A left array of holes 52*d* (one of which holes is shown in FIG. 2) and a right array of holes 54*d* (FIG. 3) are formed in the rails 52 and 54 between the respective ends thereof for reasons to be described.

With reference to FIG. 2, the pivot selector 26 is in the form of a hollow housing 26*a* having pivot pin 26*b* depending from the lower wall thereof. The selector housing 26*a* is sized to slidingly mate with the rail 52 and the flange portion 52*b* and, furthermore, to be vertically moveable so that, as assembled, the pin 26*b* can be removably inserted into any of the holes 52*d*. The right pivot selector 28, having a housing portion 28*a* and a pin 28*b*, is identical, in design as well as operation, to that of the left pivot selector 26 and will, therefore, not be described in detail.

As viewed in FIG. 2, the base member 12 includes left and right shelves 12*a* and 12*b* on which the respective rails 52 and 54 rest. The shelves 12*a* and 12*b* define arrays of holes 12*c* and 12*d* (FIG. 3) which align with corresponding respective holes 52*d* and 54*d* (FIG. 3) when the demi-boards 22 and 24 are in the retracted position shown in FIG. 1. With the pivot selector 26 mounted on the rail 52, the pivot pin 26*b* may extend downwardly through a selected hole 52*d* and through a corresponding base member hole 12*c*, thereby, pivotably connecting the left demi-board 22 to the base member 12. Similarly, with the pivot selector 28 mounted on the rail 54, the pivot pin 28*b* may extend downwardly through a selected hole 54*d* and through a corresponding base member hole 12*d*, thereby, pivotably connecting the fight demi-board 24 to the base member 12.

As shown in FIG. 3, a left arcuate track 12*e* and a fight arcuate track 12*f*, are formed in the respective shelves 12*a* and 12*b* for receiving the respective tabs 52*c* and 54*c*, thereby constraining movement of the rails 52 and 54 in a horizontal plane across the base member 12 when the demi-boards 22 and 24 are pivoted. It will be noted that the track 12*e* has opposing edges 12*e'* and 12*e"* shaped to follow arcs formed by the tab portion 52*c'* as the rail 52 is pivoted respectively about a distal hole 12*c'* or a proximate hole 12*c* (not shown). It is understood that the tab portion 52*c"* is sized to extend sufficiently to engage the edge 12*e"* as the rail 52 is pivoted about the distal hole 12*c'*, and that the tab portion 54*c"* is formed similarly. It is further understood that the track 12*f* includes edges 12*f'* and 12*f"* formed, with respect to arcuate movement of the tab portion 54*c*, similarly to the edges 12*e'* and 12*e"*.

With reference to FIG. 5A, a socket portion 38*b* is formed on the distal side of the ball portion 38*a* of the plate 38 for rotatably receiving a first ball portion 60*a* formed at one end of a lever arm 60. A second ball portion 60*b* is formed at the other end of the lever arm 60 and is received by a socket 30*b* formed on the body 30*a* of the controller 30, thereby linking the universal joint 50 to the controller 30.

As shown in both FIGS. 5A and 5B, the body 30*a* of the controller 30 also includes proximate and distal longitudinal slots 30*c* and 30*d*. As shown in FIG. 1, the base member 12 defines a slot 12*g*, formed in the base member 12 between the keyboard assembly 20 and the display 16, having a proximate straight edge 12*g'* and a distal notched edge 12*g"* for engaging the slots 30*c* and 30*d*, respectively, thereby slidingly securing the controller 30 within the slot 12*g*. A tooth 30*e* extends from the body 30*a* for engaging a selected notch in the notched edge 12*g"*. The slots 30*c* and 30*d* are sufficiently recessed in the body 30*a* to permit the controller 30 to be moved toward the proximate edge 12*g'* and longitudinally therealong, or to permit the controller 30 to be moved toward the distal edge 12*g"* and the tooth 30*e* to engage a selected notch therein, thereby securing the controller 30 in the slot 12*g*. It is noted that, as shown in FIGS. 3 and 5A with the controller 30 so secured in the slot 12*g*, the lever arm 60 extends under a portion of the base 12.

In operation, the keyboard assembly 20 may assume a large number of configurations of varying splay and pronation, including a fully retracted, or fiat, configuration, as shown in FIG. 1, which would be similar to a standard monoplane keyboard. To adjust the splay and/or pronation, the pivot points about which the demi-boards 22 and 24 pivot must first be adjusted. With respect to the left demi-board 22, the pivot point may be adjusted by lifting the pivot selector 26 sufficiently to remove the pin 26*b* from the associated pivot hole 52*d*, sliding the selector 26 along the rail 52 to a desired pivot point, and then lowering the selector 26 to insert the pin 26*b* through the desired hole 52*d* as well as the corresponding base member hole 12*c*. The point about which the fight demi-board 24 pivots may be similarly adjusted. The user may then move the controller 30 toward the proximate edge 12*g'* of the slot 12*g*, physically grasp the demi-boards 22 and 24 and pivot them about their respective pivot pins 26*b* and 28*b*, and secure the demi-boards 22 and 24 in place by moving the tooth 30*e* of the controller 30 into the appropriate notch 12*g"*.

It can be appreciated that, in accordance with the present invention, as the demi-boards 22 and 24 are pivoted, the splay as well as the pronation of the keyboards may be variably effected depending on where the pivot points are located via the pivot point selectors 26 and 28. As the pivot point selectors 26 and 28 are positioned closer to the distal sides 22*b* and 24*b* of the demi-boards 22 and 24, the splay is more greatly effected than the pronation as the demi-boards 20 and 22 are pivoted away from the retracted position of FIG. 1. As the pivot point selectors 26 and 28, however, are moved closer to the proximate sides 22*a* and 24*a* of the demi-boards 22 and 24, the pronation is more greatly effected than the splay as the demi-boards 22 and 24 are pivoted away from the retracted position of FIG. 1. Alternatively, the pivot point selectors 26 and 28 may be adjusted independently to provide further flexibility to the configuration of the keyboard assembly 20.

Figure 7:
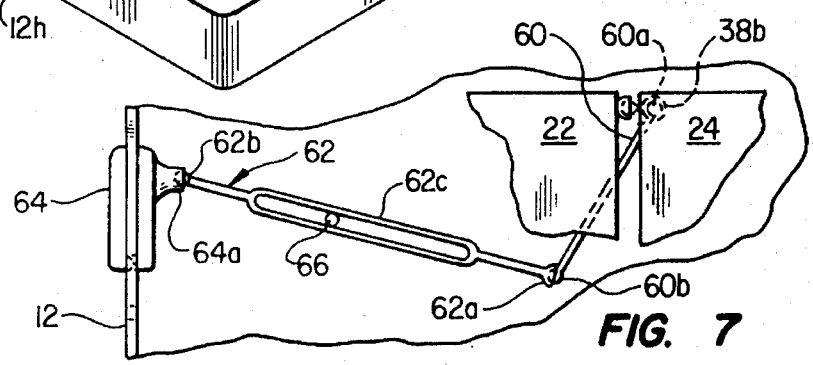
FIG. 7 is a plan view of an elongated lever utilized in the alternate embodiment of the PC of FIG. 6.

FIGS. 6 and 7 show an alternate embodiment of the present invention. Since the alternate embodiment is similar to the first embodiment of FIGS. 1–5, identical components are given the same reference numerals. According to the embodiment of FIGS. 6 and 7, the socket 38*b* is oriented downwardly (as viewed in FIG. 6) and, as in the previous embodiment, the first ball portion 60*a* of the lever arm 60 is rotatably seated therein. The second ball portion 60*b* of the lever arm 60 is rotatably seated in a socket 62*a* formed at one end of an elongated lever 62 extending substantially horizontally between the keyboard assembly 20 and the base member 12. A ball portion 62*b* is formed at the end on the lever 62 opposite the socket 62*a*, and a longitudinal slot 62*c* is formed between the socket 62*a* and the ball 62*b*. The base member 12 includes a pivot pin 66 extending upwardly (as viewed in FIG. 6) through the slot 62*c* for constraining the lever 62 to pivotal movement about, and sliding movement along, the pin 66. The ball portion 62*b* is seated in a socket 64*a* of a controller 64 similar to the controller 30. The controller 64, having a tooth and longitudinal slots (not shown), is operative for sliding in a notched slot 12*h*, formed in the left side of the base member 12, in a manner similar to that of the controller 30 in the slot 12*g*. Accordingly, the controller 64 may be moved incrementally in the slot 12*h* and secured into a notch, as in the previous embodiment, thereby causing the lever 62 to pivot about the pin 66 and to move the arm 60. As a consequence, the universal joint 50 may be elevated up or down to effect pronation of the keyboard assembly 20 as in the previous embodiment.

The present invention, as described herein, has many advantages over the prior art. For example, it enables the splay as well as the pronation of a keyboard to be adjusted to assume a large number of configurations, thereby meeting the needs of any potential user and reducing cumulative-trauma disorders and repetitive-motion injuries which commonly result from the repetitive motion of the hands and fingers on conventional keyboards. Furthermore, the present invention is sufficiently compact to be implemented in a portable computer, such as a laptop or notebook computer.

It is understood that the present invention can take many forms and embodiments. The embodiments shown herein are intended to illustrate rather than to limit the invention, it being appreciated that variations may be made without departing from the spirit or the scope of the invention. For example, the keyboard assembly 20 may be adapted for use with a full-size desktop keyboard. The pivot selectors 26 and 28 may be ratchet mechanisms operable on slots formed in the rails 52 and 54 and the demi-board shelves 12a and 12b. The pivot selectors 26 and 28 may also be spring-loaded for urging the respective pins 26b and 28b downwardly into selected holes, or for biasing respective ratchets into selected slots. The lift controller 30 or 64 may also be spring-loaded to secure selected positions in respective slots 12g or 12h. The operation of the universal joints may be performed using other techniques and components, such as double-acting hinges. The universal joint formed by the coupling of the ball 62b to the socket 64a (FIG. 7) could be replaced by a simple hinged connection. The universal joint 50 may be lifted by other mechanisms such as a variation of the T-bar support member disclosed by Rucker et al. in U.S. Pat. No. 5,351,066. The demi-boards 22 and 24 may be reinforced in splayed and pronated configurations with additional structure. The lift controllers 30 and 64 may be secured in selected positions by other techniques such as knobs adapted for adjusting the friction between the controllers and the base member 12o Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A keyboard, comprising:

two demi-boards, each of which include a plurality of user activated keys extending therefrom, and which define a distal side for orientation away from the user and a proximate side for orientation adjacent the user, said distal and proximate sides being joined by inwardly facing sides and outwardly facing sides;

a universal joint rotatably coupling said inwardly facing sides of the demi-boards;

a base member;

pivot point selectors slidably mounted to said demi-boards for selecting pivot points along said outwardly facing sides, about which points said demi-boards are pivotably connected to said base member and are constrained for pivotal movement about said selected pivot points between a retracted position in which said demi-boards are co-planar and said inwardly facing sides are parallel, and an extended position in which said demi-boards are splayed; and a lift controller interconnected between said base member and said universal joint for adjusting and controlling the height of said universal joint and the pronation of said demi-boards relative to said base member, which pronation becomes more pronounced as said pivot selectors are positioned toward said proximate sides.

2. The keyboard of claim 1 wherein said universal joint is connected at the intersection of said inwardly facing sides and said distal sides of said respective demi-boards.

3. The keyboard of claim 1 wherein said keyboard is adapted for a portable computer.

4. The keyboard of claim 1 wherein said keyboard is adapted for a desktop computer.

5. The keyboard of claim 1 wherein said outwardly facing sides of said demi-boards comprise rails hingedly attached thereto, and wherein said pivot selectors are slidably mounted on said rails.

6. The keyboard of claim 5 wherein said rails and said base member include respective corresponding holes, and each of said pivot selectors includes a pin adapted for insertion into a selected corresponding hole in each rail and said associated corresponding hole in said base member.

7. The keyboard of claim 5 wherein said rails and said base member include respective corresponding slots, and each of said pivot selectors includes a ratchet adapted for insertion into a selected slot on each rail.

8. The keyboard of claim 1 wherein said lift controller includes a lever having a first end slidably mounted in a slot formed in said base member and a second end connected to said universal joint, wherein movement of said lever in said slot adjusts the elevation of said universal joint and the pronation of said first and second demi-boards relative to said base member.

9. The keyboard of claim 1 wherein said lift controller includes an elongated lever extending between said base member and said keyboard, said lever including a slot and said base member including a pivot pin extending through said slot, said lever being thereby constrained to move along and pivot about said pivot pin;

said lever includes a first end and a second end, wherein said first end extends through said base member for actuation by the user;

said lift controller includes an extension arm having a first end and a second end, said first end of said arm being pivotably connected to said second end of said lever, said second end of said arm being pivotably connected to said universal joint, so that movement of said first end of said first lever effects the elevation of said universal joint and the pronation of said first and second demi-boards relative to said base member.

10. An adjustable keyboard for data input, comprising a base member having a longitudinal base surface extending through said base member;

a first demi-board having a distal side for orientation away from the user and a proximate side for orientation adjacent the user;

a plurality of user activated keys extending from said first demi-board, said keys facing away from said base member;

a second demi-board having a distal side for orientation away from the user and a proximate side for orientation adjacent the user;

a plurality of user activated keys extending from said second demi-board, said keys facing away from said base member;

wherein said distal and proximate sides of said first and second demi-boards are joined by respective first and second inner facing sides and respective first and second outer facing sides;

a universal joint rotatably coupling said first and second inner facing sides of said first and second demi-boards;

first and second pivot selectors slidably mounted to said outer sides for selecting a pivot point along each of said respective outer sides, about which points said respective first and second demi-boards are pivotably connected to said base member and are constrained for pivotal movement about said respective selected pivot points between a retracted position in which said first and second inner sides are parallel and an extended position in which said first and second demi-boards are splayed and pronated;

a lift controller interconnected between said base member and said universal joint for adjusting and controlling the elevation of said universal joint and the pronation of said first and second demi-boards relative to said base member, which pronation becomes more pronounced, and splay less pronounced, as said pivot selectors are moved toward said proximate ends of said outer sides.

11. The keyboard of claim 10 wherein said universal joint is connected at the intersection of said inner and said distal sides of said respective demi-boards.

12. The keyboard of claim 10 wherein said keyboard is adapted for a portable computer.

13. The keyboard of claim 10 wherein said keyboard is adapted for a desktop computer.

14. The keyboard of claim 10 further comprising first and second rails hingedly attached to said respective first and second outer sides, and wherein said first and second pivot selectors are slidably mounted on said rails.

15. The keyboard of claim 14 wherein said rails and said base member include respective corresponding holes, and each of said pivot selectors includes a pin adapted for insertion into a selected corresponding hole in each rail and said associated corresponding hole in said base member.

16. The keyboard of claim 14 wherein said rails and said base member include respective corresponding slots, and each of said pivot selectors includes a ratchet adapted for insertion into a selected slot on each rail.

17. The keyboard of claim 10 wherein said lift controller includes a lever having a first end slidably mounted in a slot formed in said base member and a second end connected to said universal joint, wherein movement of said lever in said slot adjusts the elevation of said universal joint and the pronation of said first and second demi-boards relative to said base member.

18. The keyboard of claim 10 wherein said lift controller includes an elongated lever extending between said base member and said keyboard, said lever including a slot and said base member including a pivot pin extending through said slot, said lever being thereby constrained to move along and pivot about said pivot pin;

said lever includes a first end and a second end, wherein said first end extends through said base member for actuation by the user;

said lift controller includes an extension arm having a first end and a second end, said first end of said arm being pivotably connected to said second end of said lever, said second end of said arm being pivotably connected to said universal joint, so that movement of said first end of said first lever effects the elevation of said universal joint and the pronation of said first and second demi-boards relative to said base member.

19. An adjustable keyboard assembly for data input, comprising a base member having a longitudinal support surface, said base member having a distal side intended for orientation away from the user and a proximate side for orientation adjacent the user and first and second sides joining said distal and proximate sides;

a first demi-board having a distal side for orientation away from the user, a proximate side for orientation adjacent the user, and first and second ends joining said distal and proximate sides;

a plurality of user activated keys extending from a face of said first demi-board, said keys facing away from said base member;

a first rail hingedly attached to said first side of said first demi-board and having distal and proximate ends corresponding respectively to said distal and proximate sides of said first demi-board, said first demi-board further having an array of pivot points longitudinally arranged along said rail, said base member having a first array of pivot points corresponding to said array of said pivot points on said first rail;

a first pivot selector slidably secured to said first rail for pivotably connecting a selected one of said first rail pivot points to a corresponding one of said base member pivot points so that said first rail is connected to said base member and is constrained for pivotal movement about said selected pivot point between a retracted position in which said first rail is parallel to said first side of said base member and an extended position in which said first rail forms an acute angle with respect to said first side of said base member;

a second demi-board having a distal side for orientation away from the user, a proximate side for orientation adjacent the user, first and second ends joining said distal and proximate sides;

a plurality of user activated keys extending from a face of said second demi-board, said keys facing away from said base member;

a second rail hingedly attached to said second side of said second demi-board and having distal and proximate ends corresponding respectively to said distal and proximate sides of said second demi-board, said second demi-board further having an array of pivot points longitudinally arranged along said rail, said base member having a second array of pivot points corresponding to said array of said pivot points on said second rail;

a second pivot selector slidably secured to said second rail for pivotably connecting a selected one of said second rail pivot points to a corresponding one of said base member pivot points so that said second rail is connected to said base member and is constrained for pivotal movement about said selected pivot point between a retracted position in which said second rail is parallel to said second side of said base member and an extended position in which said second rail forms an acute angle with respect to said second side of said base member; a universal joint rotatably coupling said demi-boards at the intersection of said respective inner and distal sides of said first and second demi-boards;

a lift controller interconnected between said base member and said universal joint for controlling the elevation of said first and second demi-boards between a first position and a second position; and wherein said first and second pivot point selectors are independently adjustable and, together with said lift controller, are operable for adjusting the splay and pronation of said first and second demi-boards, wherein said pronation becomes more pronounced and splay becomes less pronounced as said pivot selectors are located toward said proximate ends of said rails and away from said distal ends of said rails.

20. The keyboard of claim 19 wherein said keyboard is adapted for a portable computer.

21. The keyboard of claim 19 wherein said keyboard is adapted for a desktop computer.

22. The keyboard of claim 19 wherein said pivot points are holes, and each of said pivot selectors includes a pin adapted for insertion into a selected corresponding hole in each rail and said associated corresponding hole in said base member.

23. The keyboard of claim 22 wherein said pivot points are slots, and each of said pivot selectors includes a ratchet adapted for insertion into a selected slot on each rail.

24. The keyboard of claim 19 wherein said lift controller includes a lever having a first end slidably engaging a slot formed in said base member and a second end connected to said universal joint, wherein movement of said lever in said slot controls elevation of said universal joint and pronation of said first and second demi-boards relative to said base member.

25. The keyboard of claim 19 wherein said lift controller includes an elongated lever extending between said base member and said keyboard, said lever including a slot and said base member including a pivot pin extending through said slot, said lever being thereby constrained to move along and pivot about said pivot pin;

said lever includes a first end and a second end, wherein said first end extends through said base member for actuation by the user;

said lift controller includes an extension arm having a first end and a second end, said first end of said arm being pivotably connected to said second end of said lever, said second end of said arm being pivotably connected to said universal joint, so that movement of said first end of said first lever controls elevation of said universal joint and pronation of said first and second demi-boards relative to said base member.

\* \* \* \* \*

UNITED STATES PATENT AND TRADEMARK OFFICE
CERTIFICATE OF CORRECTION

PATENT NO. : 5,613,786
DATED : March 25, 1997
INVENTOR(S) : Bryan Howell; Bryan Hunter It is certified that error appears in the above-indentified patent and that said Letters Patent is hereby corrected as shown below:

Column 1, line 65, "m,n,plane" should read --monoplane--.

Column 4, line 25, "fight" should read --right--.

Column 4, line 27, "fight" should read --right--.

Column 4, line 28, "fight" should read --right--.

Column 4, line 44, "fight" should read --right--.

Column 4, line 49, "fight" should read --right--.

Column 5, line 29, "fight" should read --right--.

Column 5, line 31, "fight" should read --right--.

Column 6, line 7, "fiat" should read --flat--.

Column 6, line 18, "fight" should read --right--.

Column 7, line 40, "o" should read --.-- [a period].

Signed and Sealed this

Fifteenth Day of July, 1997

*Attest:*

BRUCE LEHMAN

*Attesting Officer*     *Commissioner of Patents and Trademarks*